April 3, 1951  R. L. WILCOX  2,547,801
METHOD OF AND MEANS FOR MAKING DOUBLE
CHAMFERED NUTS OR THE LIKE
Filed April 21, 1945  3 Sheets-Sheet 1
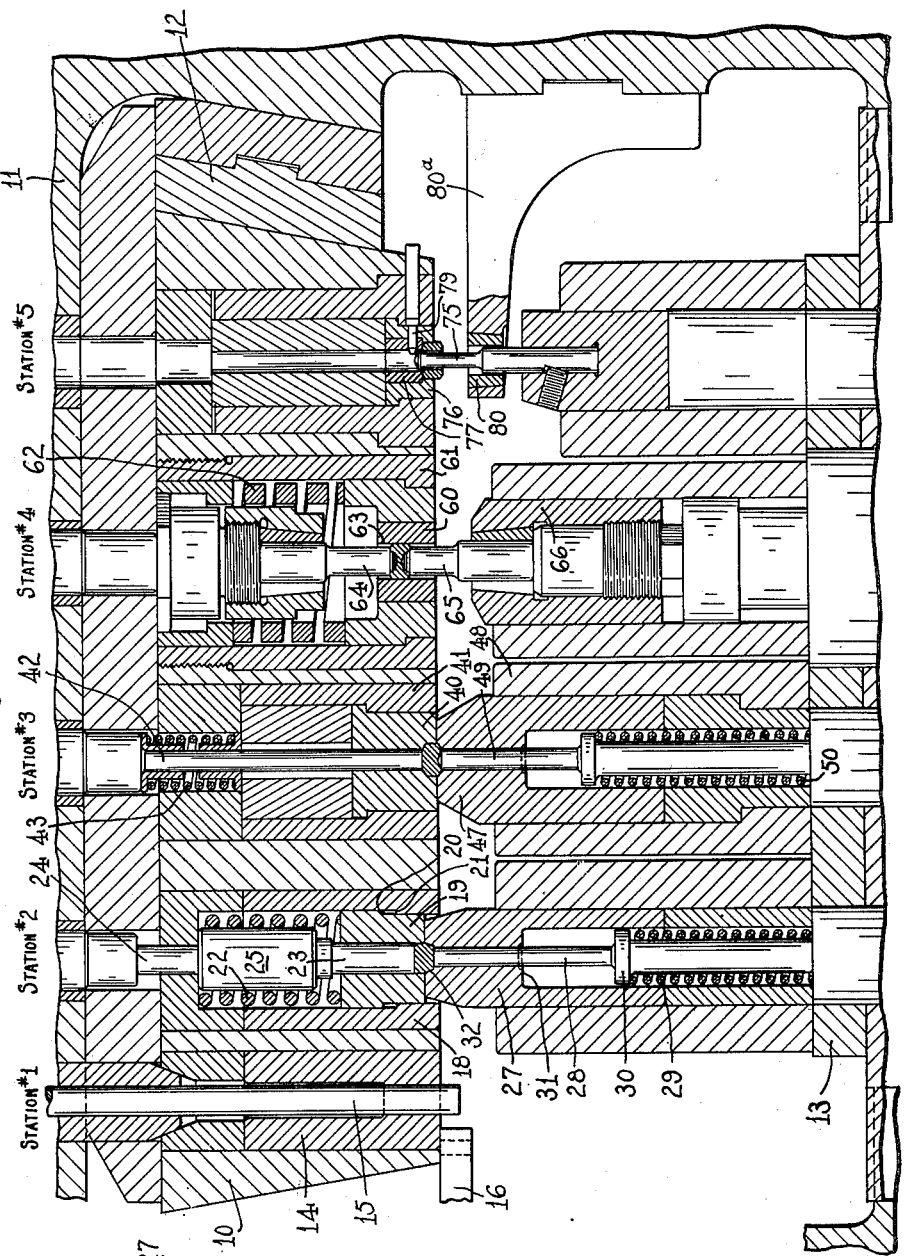
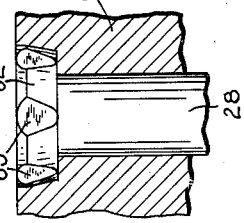
Inventor
Richard Lester Wilcox
By Rockwell & Bartholow
Attorneys April 3, 1951 R. L. WILCOX 2,547,801
METHOD OF AND MEANS FOR MAKING DOUBLE
CHAMFERED NUTS OR THE LIKE
Filed April 21, 1945 3 Sheets-Sheet 3
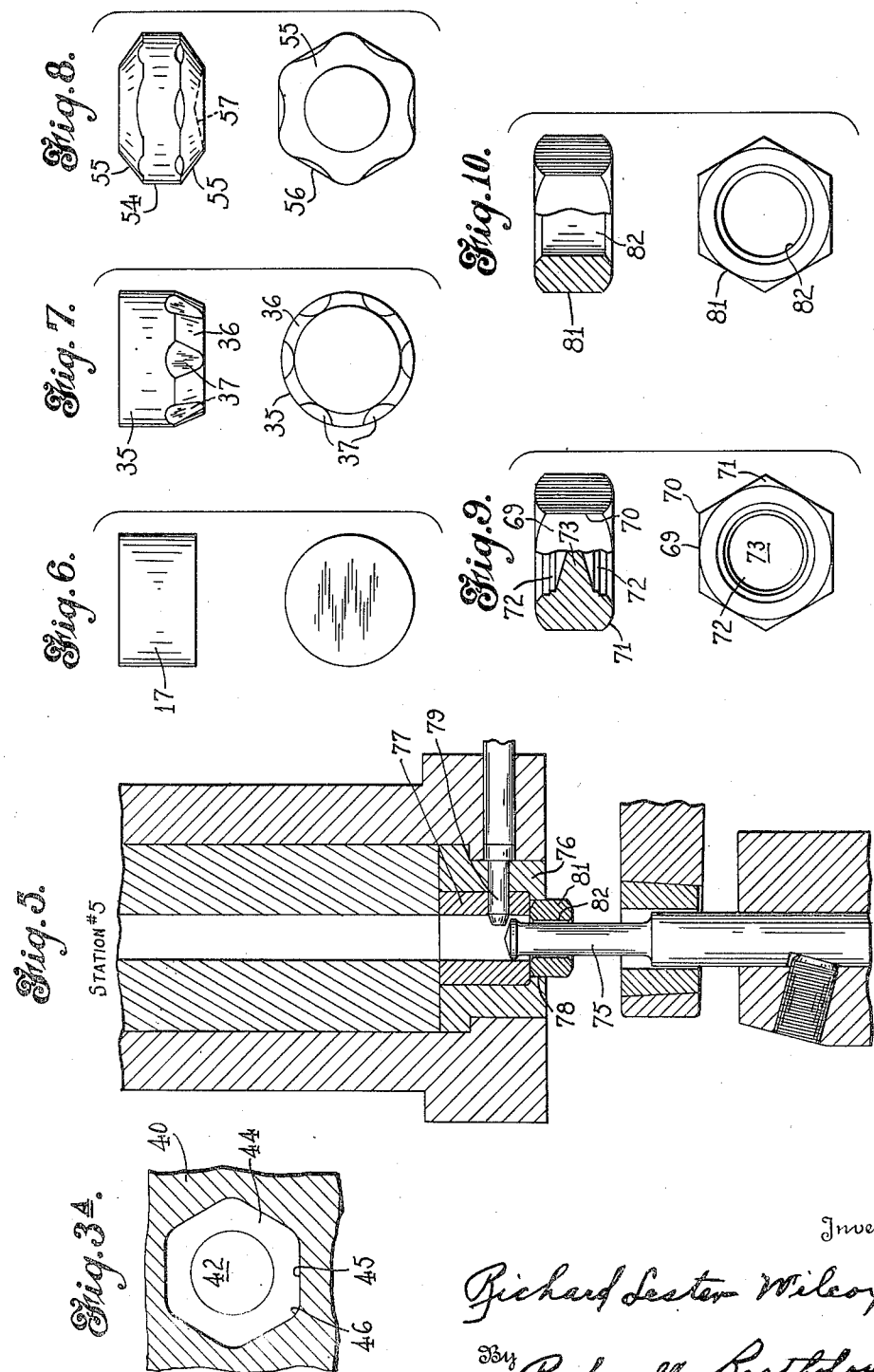
Inventor
Richard Lester Wilcox
By Rockwell & Bartholow
Attorneys Patented Apr. 3, 1951

2,547,801

UNITED STATES PATENT OFFICE 2,547,801

METHOD OF AND MEANS FOR MAKING DOUBLE CHAMFERED NUTS OR THE LIKE

Richard Lester Wilcox, Waterbury, Conn., assignor to The Waterbury Farrel Foundry & Machine Company, Waterbury, Conn., a corporation of Connecticut Application April 21, 1945, Serial No. 589,634

6 Claims. (Cl. 10—86)

1

This invention relates to a method of and machine for making nuts or similar articles, and more particularly to a method of making a polygonal nut, chamfered on one or both faces.

As shown in the drawings, the method comprises a series of steps consisting of pressing operations at a plurality of stations in the same machine to cut off a suitable length of solid stock, which length becomes the workpiece, and then forming this workpiece while cold into the finished blank. These operations are carried out upon a machine having a plurality of stations at which the several steps of the process are performed, the workpiece being transferred from one station to another and the machine serving to perform the several operations upon different workpieces or blanks at the same time.

In prior machines of the character described above, such, for example, as that shown in my Patent No. 1,832,168, the stock from which the workpiece is cut is of relatively small diameter as compared to the dimension of the finished blank across two opposing flat sides thereof. This necessitates considerable lateral flow of the metal and, if the wire stock employed contains any seams or imperfections, the expansion of the metal will open these seams and thus render the finished blank defective.

To overcome the above disadvantage, it is contemplated by the present method to employ bar stock of a relatively large diameter compared to the width of the finished blank. For example, in the previous practice, it was usual to employ bar stock having a diameter approximately 77 per cent of the dimension of the finished blank across two opposing flat sides, while in the present process, I can employ a much larger diameter of approximately 92 per cent of the dimension across the opposing flat sides of the finished polygonal blank. In the present process, therefore, much less lateral flow is required and the expansion of the metal is not sufficient to open the seams in the stock even where seams exist.

One object of the invention is to provide a novel method of forming a polygonal nut blank from solid stock.

A still further object of the invention is to provide a novel method for forming a polygonal nut blank from solid bar stock which will permit the use of stock of a relatively large diameter as compared with the width of the finished blank.

A still further object of the invention is to provide a novel method for forming a nut blank in a series of steps performed at successive stations in a single machine such that the operations at

2 certain of the stations will be begun or partially performed at preceding stations, thus reducing the work required at succeeding stations.

A still further object of the invention is to provide a machine for carrying out the improved process described above.

Still another object of the invention is to provide a machine for forming nut blanks, the machine having a plurality of stations at which successive operations are performed on the work which is transferred successively from one station to another, the operations being of such a character as to permit the employment of a workpiece of relatively large diameter as compared to the width of the finished blank.

To these and other ends the invention consists in the novel features and combinations of parts to be hereinafter described and claimed.

In the accompanying drawings:

Fig. 1 is a sectional view of the working portion of a nut former or press embodying my invention and designed to carry out my improved process;

Fig. 2A is a sectional view of the end of the punch employed at station #2.

Fig. 3A is a sectional view on line 3A—3A of Fig. 3;

Figs. 4 and 5 are sectional views of the tools employed at stations #4 and #5 of the machine;

Fig. 6 illustrates in side elevation and top plan view the workpiece employed to make the blank;

Fig. 7 shows similar views of the workpiece after the operations performed at station #2;

Fig. 8 shows similar views of the workpiece after being subjected to the operation performed by the tools at station #3;

Fig. 9 illustrates similar views of the workpiece after being subjected to the operations performed by the tools at station #4; and Fig. 10 shows the finished blank after the piercing operation at station #5.

Figure 4:
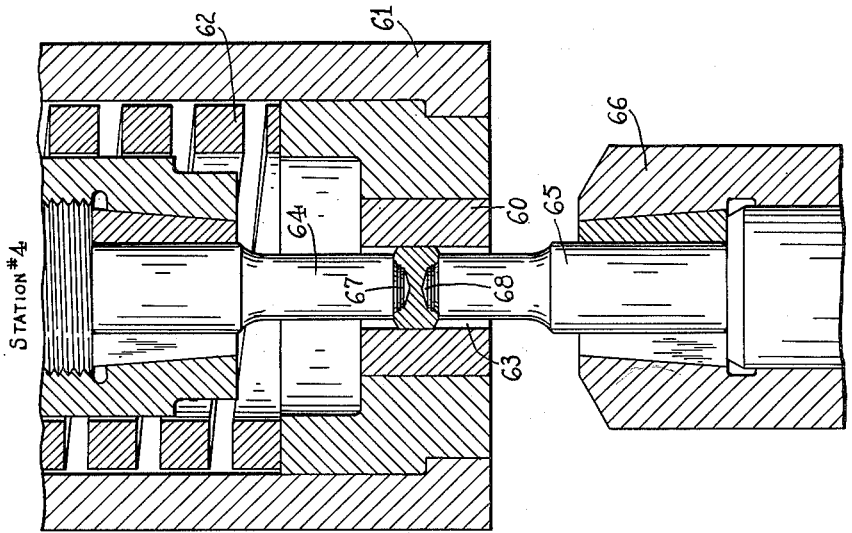

To illustrate my improved method and one embodiment of a machine for carrying out the method, I have shown a die block 10 held at one end of a header frame 11 by wedges 12 and a movable gate 13 designed to be reciprocated toward and from the die block in the usual manner and carrying a plurality of tools to cooperate with a plurality of separate dies mounted in the die block as will be hereinafter explained.

At station #1 in the machine is mounted a cut-off die 14 having an opening through which is fed a length of stock 15 so that a small portion thereof will protrude from the die to be severed by the cut-off knife 16 which is shown diagrammatically as this is well-known practice in the art. After a short length or workpiece 17 (Fig. 6) is cut from the length of stock, this piece is transferred to the second station of the machine by the knife 16 in the usual manner.

At station #2 a die holder 18 is mounted in the die block, the die holder having an opening therein in which is movably guided a die 19 having a shoulder 20 cooperating with an oppositely facing shoulder 21 of the die holder 18 to limit movement of the die in one direction. The die 19 is urged forwardly by a relatively strong compression spring 22 so that the shoulder 20 will normally stand against the shoulder 21 and the forward face of the die being flush with the face of the die holder. Also movably mounted in the die holder is a knock-out pin 23 disposed within an opening in the die and designed to substantially fill this opening. The knock-out pin is actuated by a knock-out rod 24 which may be advanced by a suitable mechanism (not shown) against a filler plug 25 which in turn engages the knock-out pin 23.

At station #2 the gate is provided with a punch 27 having a longitudinal opening within which is mounted a pin 28, which pin is urged outwardly by the compression spring 29, the outward movement being limited by contact of the shoulder 30 on the pin with the forward end 31 of the opening within which the pin is mounted. As shown, the gate is in its advanced position, and it will be seen that when it is retracted and the punch 27 withdrawn from engagement with the die, the pin 28 will be advanced by the spring 29 and will project beyond the outer end of the punch.

Figure 2:
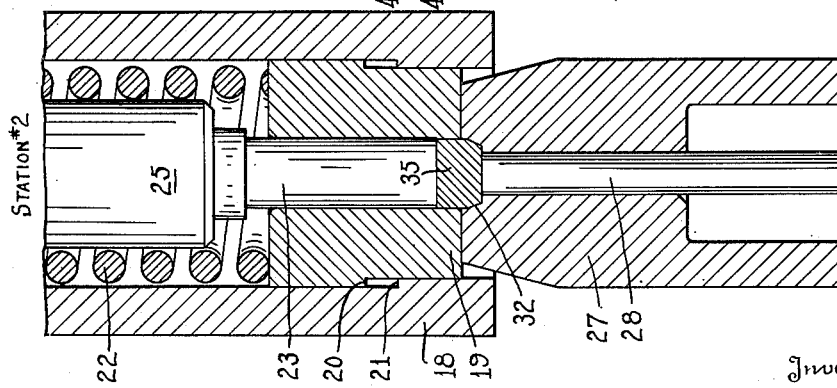
Fig. 2 is an enlarged sectional view of the tools employed at station #2 in the machine.

In the end of the punch 27 is an opening or recess 32 which, as shown more particularly in Fig. 2A, is tapered or cone-shaped in form and, upon the side wall of the cone-shaped portion of this opening, are a plurality of flattened areas 33 which as will be hereinafter described form flattened areas or flat spots upon the workpiece.

When the gate is withdrawn from the position shown in Fig. 1, the pin 28 will project therefrom as previously described. With the parts in this position, a workpiece 17 cut from the length of stock will be advanced by the knife 16 to a point in registration with the opening in the die 19, the forward face of the die standing at this time flush with the face of the die holder 18 under the force of the spring 22. The gate will then be advanced and the end of the pin 28 will engage the workpiece and force it out of the cutter 16 into the opening in the die 19, permitting the knife to withdraw. As the gate is advanced, the pin 28 will be retracted relatively to the punch 27 after the workpiece has been seated against the pin 23, and the outer end of the punch 27 will come into contact with the outer face of the die 19, thus enclosing the work within the complemental openings of the die and punch, at which time the pin 28 will close the rear end of the opening in the punch. Upon a still further advance of the gate, the punch and die will move together, the die moving against the tension of spring 22 until the metal of the workpiece has been caused to flow and completely fill the cavity formed by the complemental openings of the die and punch between the pins 23 and 28. It will be seen that prior to any extrusion or flow of the metal in the blank, the forward face of the punch will engage the outer face of the die so as to completely close the complemental cavities in the punch and die and thus completely enclose the blank, the forming or flow taking place during the time that the punch and die are moved rearwardly together against the tension of the die spring.

As the blank emerges from station #2, it is shaped in the form shown at 35 in Fig. 7, the upper portion being substantially cylindrical in form, but the end being tapered as shown at 36 and provided with flattened areas or spots 37, the number of which will correspond to the number of flat faces desired on the finished polygonal blank.

Figure 3:
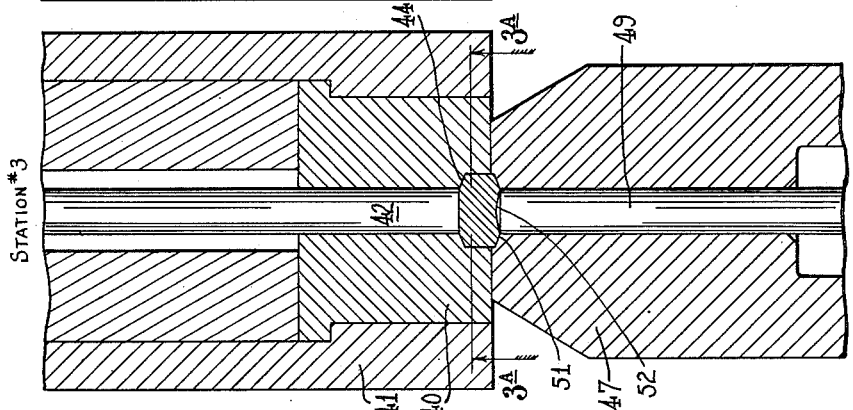
Fig. 3 is an enlarged sectional view of the tools employed at station #3.

The workpiece or blank 35 will then be carried to station #3 by suitable transfer mechanism (not shown). At this station, a fixed die 40 is suitably mounted in a die holder 41, the die having an opening within which moves a knock-out pin 42 advanced by the usual mechanism, this pin being adapted to be retracted by the spring 43. The opening in the face of the die, shown more particularly in Figs. 3 and 3A, is provided with a cone- or dome-shaped inner end 44 while the remainder of the die opening has a plurality of flat sides 45 with round or unfinished corners 46 between these sides which will, as hereinafter described, serve to form flat sides upon the workpiece, although these sides will not be drawn into the form desired in the finished blank.

At this station, a punch 47 is secured to the gate in a punch holder 48, and movably associated with the punch is a pin 49 urged outwardly by the spring 50. The punch is provided in its forward face with a complemental opening 51 of dome-shaped form so that, as shown in Fig. 3, the workpiece will be confined within the complemental openings in the punch 47 and die 40 between the pins 42 and 49. The number of flattened faces in the die opening will, of course, correspond to the number of flattened areas 33 in the opening of the punch 47 and will be the same number of flat sides desired on the finished blank. Also, as shown in Fig. 3, the end of the punch 49 is coned or pointed as at 52 to indent the adjacent face of the workpiece.

After the workpiece has been ejected from the die 19 at station #2 by the knock-out pin 23, it is engaged by suitable transfer mechanism and carried to the third station with the flat spots 37 in registration with the flat sides 45 of the die opening. As the gate advances, the pin 49 which projects from the face of the punch under the impulse of spring 50, engages the workpiece 35 and permits the transfer fingers to withdraw, the pin pushing the workpiece into the opening in the die 40. As the gate continues its advance, the spring 50 is compressed until the forward face of the punch 47 meets the outer faces of the die 40 at which time the pin 49 will close the recess or opening 51 in the punch. The operation of the tools at station #3 will form the workpiece into the shape shown at 54 in Fig. 8 where it will be noted both ends of the blank are domed or coned as shown at 55, and intermediate these domed ends preliminary or partial flat faces 56 are provided on the side wall. Also, the face of the workpiece or blank adjacent the punch 47 will be indented as shown at 57 by the conical or pointed end 52 of the punch 49. Thus, as shown in Fig. 8 of the drawings, the workpiece will be upset to cause enlargement of its cross sectional area so as to fill the cavity formed by the complemental recesses in the punch and die so as to simultaneously dome or cone the ends and form the partial flat sides between such ends. The blank will now be ejected from this station by the knock-out pin 42 and will be transferred by suitable mechanism to station #4 on the machine.

At this station, a floating die 60 is movably mounted in a die holder 61, the die being urged outwardly by a strong spring 62 and having a polygonal opening 63 therein within which operates a punch 64.

The gate is provided at station #4 with a fixed punch 65 held in a punch holder 66. As will be apparent from Fig. 4, the punches 64 and 65 are provided with progressively reduced stepped ends 67 and 68 to form relatively deep recesses in the blank so as to leave a thin web between the bottoms of these recesses. It may also be here stated that while the opening 63 in the die is polygonal in shape, the working ends of the punches 64 and 65 are circular, the diameter of the punches being slightly less than the width across two opposite flat faces of the die opening.

When a blank has been carried to a position in alignment with the tools in station #4 by the usual transfer mechanism, the gate advances and the punch 65 pushes the blank out of the transfer mechanism into the recess or opening 63 of the die 60. Continued advance of the punch causes the blank to be compressed between the punches 64 and 65 and the metal of the blank will be caused to flow laterally against the polygonal sides of the die opening and to fill the sharp corners between these sides. Also, the punches 64 and 65 which contact a circular area on the faces of the workpiece will form chamfered end faces on the blank, whereupon the gate will be withdrawn and the blank ejected from the die by the punch 64.

At this time the blank is in the form shown in Fig. 9 of the drawings where it will be observed it has been provided with true polygonal side faces 69 between their sharp corners 70 and the end faces are chamfered as shown at 71 and also provided with relatively deep recesses 72, leaving a thin web 73 between the bottoms of the recesses.

This true hexagonal blank is now transferred to the fifth station of the machine where the web 73 is punched therefrom so as to provide an opening to receive a thread. At this station, the gate is provided with a piercing punch 75 which cooperates with a fixed retainer die 76 held against the end of a bushing 77, the bushing forming an anvil against which the blank may rest as the punch 75 advances and pushes out the web of metal remaining between the recesses 72 and 73.

It may be noted that the retainer die 76 is solid instead of sectional as has sometimes been the case in the past, and is provided with an opening 78 of the exact dimensions of the finished nut. It will also be noted that this opening encloses only that portion of the end of the blank 81 which is remote from the punch or what may be described as the rear end of the blank. When the blank is pierced, it will have a tendency to enlarge or swell due to the forces exerted upon it and sometimes a sectional die or what was termed a multiple cluster die was employed to enclose the blank and prevent the swelling thereof and, at the same time, permit easy ejection of the blank after the piercing operation. I have ascertained that this swelling or enlargement takes place only at the rear end of the blank which rests against the bushing 77, and it is, therefore, only necessary to confine the blank adjacent this end. Therefore, the opening in the die 76 is of much less depth than the thickness of the blank, in fact, approximately one-third of the blank thickness, so that while no deformation or swelling of the blank is permitted, the latter will be readily drawn from the die with the return of the piercing punch 75.

A pin 79 prevents the pierced slug from returning with the punch when the gate is withdrawn. The blank 81 will, however, be withdrawn from the die 76 with the punch 75 and will be stripped from this punch by the stripper bushing 80 mounted in a fixed arm 80ª attached to the frame of the machine.

The blank 81, after it has been operated upon by the tools in station #5, is shown in Fig. 10 of the drawings where it will be provided with an opening 82 suitable for receiving a thread which will complete the manufacture of the nut.

While I have shown and described a preferred embodiment of my invention and a preferred method of carrying out my improved process, it will be understood that the invention is not to be limited to all the details shown, nor the process limited to the particular steps described, but both are capable of modification and variation within the spirit of the invention and the scope of the claims.

What I claim is:

1. In a machine for forming nut blanks, a die and a cooperating punch having complementary opposing openings therein to confine the work within said openings between the die and punch, the opening in the punch having relatively small flattened areas on the wall thereof adjacent the inner end of the opening, said die being spring pressed toward the punch to yield under pressure and having an opening through the rear end thereof, a relatively fixed tool projecting into said opening, and means for advancing the punch against said die to move the latter and press the work against said tool.

2. The method of making nut blanks of polygonal shape, which comprises cutting a workpiece from a length of solid stock, feeding said workpiece into an opening in a movable die, advancing, against said die, a punch having a forming recess in its forward face to complement the opening in the die, the recess in the punch being reduced in size adjacent its rear end and provided with flat faces on the wall of such reduced portion and thereafter advancing said punch and die together to press the workpiece against a fixed member extending into the rear of the die opening and thereby reducing the cross-sectional size of the blank at the end adjacent the punch and forming flat faces on the side walls of said reduced portion.

3. The method of making nut blanks of polygonal shape, which comprises cutting a workpiece from a length of solid stock, feeding said workpiece into an opening in a movable die, advancing, against said die, a punch having a forming recess in its forward face to complement the opening in the die, thereafter advancing said punch and die together to press the workpiece against a fixed member extending into the rear of the die opening, and the recess in the punch having a plurality of flat surfaces on its side wall to form complementary flat surfaces on the sides of the workpiece adjacent the end thereof.

4. The method of making nut blanks of polygonal shape which comprises cutting a workpiece from a length of solid rod stock and then reducing the cross-sectional size of the workpiece at one end thereof while maintaining the original cross-sectional size of the remainder of the workpiece, and simultaneously forming on the side walls of said reduced end a plurality of flat faces, and then enlarging the workpiece adjacent the central portion thereof and forming flat faces on the sides of the enlarged portion by pressure on both faces of the workpiece while confining the latter in a suitable die.

5. The method of making nut blanks of polygonal shape which comprises cutting a workpiece from a length of solid rod stock and then reducing the cross-sectional size of the workpiece at one end thereof while maintaining the original cross-sectional size of the remainder of the workpiece, and simultaneously forming on the side walls of said reduced end a plurality of flat faces, and then applying pressure to both ends of the workpiece while the latter is confined in a suitable die to force the metal outwardly at the central portion thereof and form flattened faces on its side walls.

6. The method of making nut blanks of polyonal shape which comprises cutting a workpiece from a length of solid rod stock of a diameter of at least eighty percent of the dimension of the finished blank across two opposite flat sides thereof, and simultaneously reducing the size of the workpiece at one end while maintaining the original dimensions of the remainder of the workpiece, the reduced end of the workpiece having a tapered side wall, and forming on said side wall a plurality of flattened areas, and then applying pressure to both ends of the workpiece while confining it in a suitable die to enlarge the central portion thereof and form flattened surfaces on the side walls of said enlarged portion.

RICHARD LESTER WILCOX.

REFERENCES CITED

The following references are of record in the file of this patent:

UNITED STATES PATENTS

| Number | Name | Date |
|---|---|---|
| 1,076,079 | Tideman | Oct. 21, 1913 |
| 1,277,366 | Blake | Sept. 3, 1918 |
| 1,408,917 | Wilcox | Mar. 7, 1922 |
| 1,829,558 | Frayer et al. | Oct. 27, 1931 |
| 1,957,922 | Wilcox | May 8, 1934 |
| 2,077,519 | Frayer | Apr. 20, 1937 |
| 2,112,284 | Gaess | Mar. 29, 1938 |

FOREIGN PATENTS

| Number | Country | Date |
|---|---|---|
| 5,916 1912 | Great Britain | Mar. 6, 1913 |
| 304,122 | Germany | Mar. 4, 1918 |